(12) United States Patent
Kalineak

(10) Patent No.: US 12,397,716 B2
(45) Date of Patent: Aug. 26, 2025

(54) WARDROBE FOR A STOWAGE SPACE OF A PASSENGER CAR

(71) Applicant: Mercedes-Benz Group AG, Stuttgart (DE)

(72) Inventor: Kevin Kalineak, Boeblingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 128 days.

(21) Appl. No.: 18/263,294

(22) PCT Filed: Jan. 31, 2022

(86) PCT No.: PCT/EP2022/052157
§ 371 (c)(1),
(2) Date: Jul. 27, 2023

(87) PCT Pub. No.: WO2022/171466
PCT Pub. Date: Aug. 18, 2022

(65) Prior Publication Data
US 2024/0317143 A1    Sep. 26, 2024

(30) Foreign Application Priority Data
Feb. 9, 2021    (DE) ..................... 10 2021 000 661.5

(51) Int. Cl.
*B60R 7/02*    (2006.01)
*B60R 7/10*    (2006.01)

(52) U.S. Cl.
CPC . *B60R 7/10* (2013.01); *B60R 7/02* (2013.01)

(58) Field of Classification Search
CPC .................................. B60R 7/10; B60R 7/02

USPC ............................................ 224/484; 296/152
See application file for complete search history.

(56) References Cited

U.S. PATENT DOCUMENTS

| 2,469,068 | A | * | 5/1949 | Ford | ........................ B60R 7/00 |
| | | | | | 224/927 |
| 2,550,172 | A | * | 4/1951 | Swalwell | .................. B60R 7/10 |
| | | | | | 211/105.1 |
| 2,573,102 | A | * | 10/1951 | Hennessy | ................. B60R 7/10 |
| | | | | | 224/927 |

(Continued)

FOREIGN PATENT DOCUMENTS

| DE | 10 2005 049 137 A1 | 4/2007 |
| EP | 2 574 505 A1 | 4/2013 |

OTHER PUBLICATIONS

PCT/EP2022/052157, International Search Report dated Apr. 20, 2022 (Two (2) pages).

(Continued)

*Primary Examiner* — Nathan J Newhouse
*Assistant Examiner* — Lester L Vanterpool
(74) *Attorney, Agent, or Firm* — Crowell & Moring LLP

(57) ABSTRACT

A wardrobe of a stowage space of a passenger car includes a stowage space lid where a hanger is disposed on an inside of the stowage space lid and where an item of clothing is hangable on the hanger in a hanging position when the stowage space lid is open. The wardrobe further includes a storage device where the item of clothing is displaceable by the storage device, when the stowage space lid is closed, from the hanging position to a storage position on an underside of the inside of the stowage space lid and/or below an upper side of the stowage space.

14 Claims, 4 Drawing Sheets

(56) References Cited

U.S. PATENT DOCUMENTS

| | | | | | |
|---|---|---|---|---|---|
| 2,577,263 | A | * | 12/1951 | Myers | B62D 25/12 |
| | | | | | 224/927 |
| 2,908,522 | A | * | 10/1959 | Glave | E05C 17/36 |
| | | | | | 292/DIG. 43 |
| 3,318,471 | A | * | 5/1967 | Barr | B60R 7/10 |
| | | | | | 224/572 |
| 4,188,061 | A | * | 2/1980 | Shehi | E05C 17/36 |
| | | | | | 296/76 |
| 4,671,556 | A | * | 6/1987 | Lynas, III | B60R 7/08 |
| | | | | | 224/313 |
| 5,226,569 | A | * | 7/1993 | Watjer | B60R 7/10 |
| | | | | | 224/927 |
| 5,320,398 | A | * | 6/1994 | Popp | E05C 17/36 |
| | | | | | 292/288 |
| 5,361,612 | A | * | 11/1994 | Voiculescu | E05C 17/36 |
| | | | | | 70/279.1 |
| 7,331,625 | B2 | * | 2/2008 | Kowalski | B60R 7/10 |
| | | | | | 296/1.07 |
| 8,413,862 | B2 | * | 4/2013 | Castillo | B60R 7/02 |
| | | | | | 224/927 |
| 9,902,329 | B2 | * | 2/2018 | Izydorek | B60R 9/055 |
| 2012/0085799 | A1 | | 4/2012 | Castillo | |

OTHER PUBLICATIONS

German-language German Office Action issued in German application No. 10 2021 000 661.5 dated Nov. 8, 2022 (Seven (7) pages).

\* cited by examiner

WARDROBE FOR A STOWAGE SPACE OF A PASSENGER CAR

BACKGROUND AND SUMMARY OF THE INVENTION

The invention relates to a wardrobe for a stowage space of a passenger car.

Storing items of clothing in the stowage space or boot of a passenger car is often problematic, since, for example, there may be other objects, dirt, water or the like in the stowage space or on the floor thereof. This often results in soiling or creasing of the items of clothing. In addition, it is sometimes not possible to fully utilize the capacity of the stowage space when storing items of clothing.

A storage box for a cargo space of vehicles is known from EP 2 574 505 A1, in which a roller blind cover for covering the cargo space can be brought into a position in which it forms a trough-like receptacle on the upper side, in which receptacle items of clothing can be stored. However, such an arrangement only allows the respective items of clothing to be placed above the stowage space and thus also more or less outside the stowage space. Moreover, such a set-up is not suitable for notchback saloons.

The object of the present invention is therefore to create a wardrobe for a stowage space of a passenger car by means of which respective items of clothing can be stored particularly favourably within the stowage space.

The wardrobe according to the invention for a stowage space of a passenger car comprises a stowage space lid which makes the stowage space accessible or closes it and on the inside of which is arranged a hanging means on which at least one item of clothing can be hung in a hanging position when the stowage space lid is open. Furthermore, the wardrobe comprises a storage device by means of which the at least one item of clothing can be displaced, when the stowage space lid is closed, from the hanging position to a storage position at least substantially on the underside of the inside of the stowage space lid and/or of an upper side of the stowage space.

It is accordingly provided according to the invention that respective item of clothing can initially be arranged in a hanging position on the corresponding hanging means when the stowage space lid is open, after which, when the stowage space lid is closed, it can be displaced by means of the storage device from the hanging position into the storage position, in which the item of clothing is arranged in an approximately horizontal position, for example, in the area in proximity to the underside of the inside of the stowage space lid and/or of an upper side of the stowage space. Therefore, when the stowage space lid is closed, the at least one item of clothing is particularly expediently moved into an upper area of the stowage space in which no objects are located and/or no dirty water or the like collects. As a result, the respective items of clothing can be stored carefully and in a particularly expedient manner without them becoming soiled or creased in particular.

In a further embodiment of the invention, it has been shown to be advantageous if the storage device has at least one flexible storage element, the length of which relative to the stowage space lid can be changed with its one end on the inside of the stowage space lid and with its other end by means of a retraction device. By changing the relative length of the flexible storage element, the at least one item of clothing can be displaced from the hanging position to the storage position and vice versa during the closing or opening of the stowage space lid. Flexible in this context means that the respective storage element can be reversibly bent and rolled up without any plastic deformation occurring as result of the bending or rolling up or the like. In particular, textiles are conceivable here, for example textile straps or textile webs, or else strips, webs or the like made of a plastic, a reinforced plastic film or the like.

In a further embodiment of the invention, respective storage straps or the like are provided as flexible storage elements, the length of which relative to the stowage space lid can be changed with their one end on the inside of the stowage space lid and with their other end by means of a respective retraction device. By way of example, two storage straps running parallel to each other can be provided, by means of which the respective items of clothing can be displaced between the hanging position and the storage position with the stowage space lid is closed or opened. Such storage straps can be accommodated in the stowage space in a particularly space-saving manner and, moreover, can be retracted or released particularly expediently by means of respective retraction devices.

A further advantageous embodiment provides that on the side of the at least one item of clothing opposite the at least one flexible storage element, at least one further flexible storage element or respective storage straps is/are provided, the length of which relative to the stowage space lid can be changed with its/their one end on the inside of the stowage space lid and with its/their other end by means of a respective retraction device, wherein the item of clothing is arranged in its storage position between the flexible storage elements or storage straps on both sides. The storage elements or storage straps arranged on both sides thus enable a particularly reliable displacement of the items of clothing between the hanging position and the storage position.

Furthermore, it has been shown to be advantageous if respective transverse storage elements extend between the storage straps. For example, these transverse storage elements can extend between storage straps that run essentially parallel to each other. The transverse storage elements enable a particularly reliable storage of the items of clothing, in particular in their storage position. The transverse storage elements can also be formed, for example, as flexible straps, strips or the like mad of a textile or plastic. This results in an overall extremely space-saving and easily stowable arrangement of the storage straps or transverse storage elements. However, it would also be conceivable to use rigid elements, for example made of wood, plastic or metal.

A further advantageous embodiment provides that the storage device has at least one deflector element for the associated flexible storage element or respective storage straps. Thus, the respective item of clothing can be displaced particularly reliable between the hanging position and the storage position.

In this context it has been shown to be further advantageous if at least one guide element is provided on the deflector element, by means of which guide element the flexible storage elements or storage straps are retained spaced apart from one another in the storage position.

Further advantages and details of the invention result from the following description of preferred exemplary embodiments and on the basis of the drawings. The features and combinations of features mentioned above in the description and the features and combinations of features mentioned below in the description of the figures and/or shown in the figures alone can be used not only in the respective given combination but also in other combinations or in isolation, without departing from the scope of the invention.

DETAILED DESCRIPTION OF THE DRAWINGS

Figure 1:
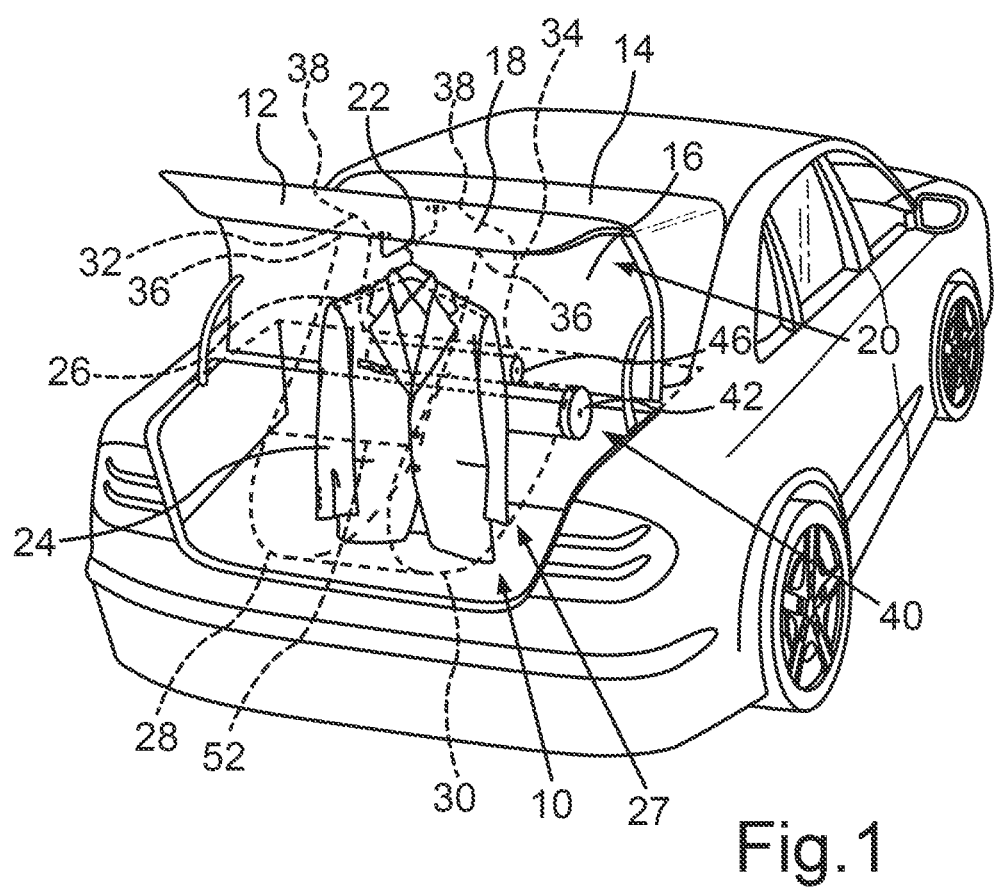
FIG. 1 shows a schematic and perspective rear view of a notchback passenger car having a stowage space which can be closed by a stowage space lid shown here in its open position, on the inside of which is arranged a wardrobe hanging means on which items of clothing can be hung in a hanging position when the stowage space lid is open.

FIG. 1 illustrates a schematic and perspective rear view of a notchback passenger car. This passenger car comprises a stowage space 10 at the rear which can be closed by a stowage space lid or rear lid 12 that belongs to a wardrobe and is shown here in its open position.

Figure 2:
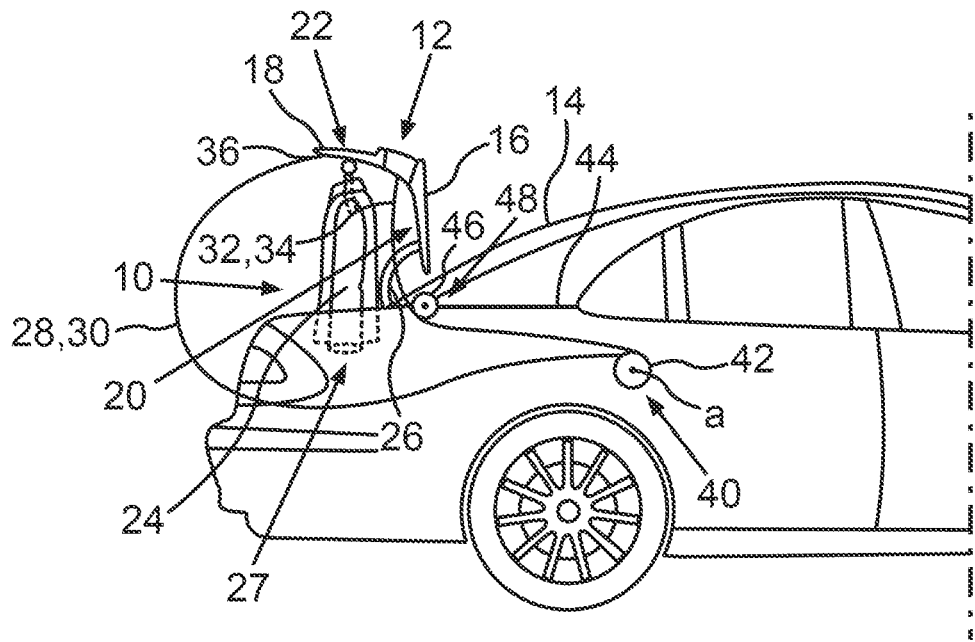
FIG. 2 shows a schematic side view of the passenger car in the area of the stowage space with the wardrobe, the hanging means of which as per FIG. 1 respective items of clothing are arranged in a hanging position.

When viewed together with FIG. 2, which shows the saloon in a schematic side view analogous to FIG. 1 with the stowage space lid 12 open, it can be seen that the stowage space lid 12 comprises an area 16 which, in the closed position, adjoins a rear window 14 and overruns approximately horizontally and an area 18 which is angled with respect to the area 16 and extends level with a rear wall. On an inner side of the stowage space lid 12 in the area 18, a wardrobe provides a hanging means 2, for example in the form of an eyelet, a bracket, a hook or the like, on which at least one item of clothing 24 can be hung or arranged in a hanging position when the stowage space lid 12 is open. This can be done, for example, with the aid of clothes hangers or the like. As can be seen in FIGS. 1 and 2, the lower end of the respective items of clothing 24 hangs down into the area of the open stowage space 10.

In the present case, the stowage space lid 12 is pivotably mounted on the body by respective brackets 26 in order to effect the pivoting movement between its open position shown here and its closed position.

Figure 3:
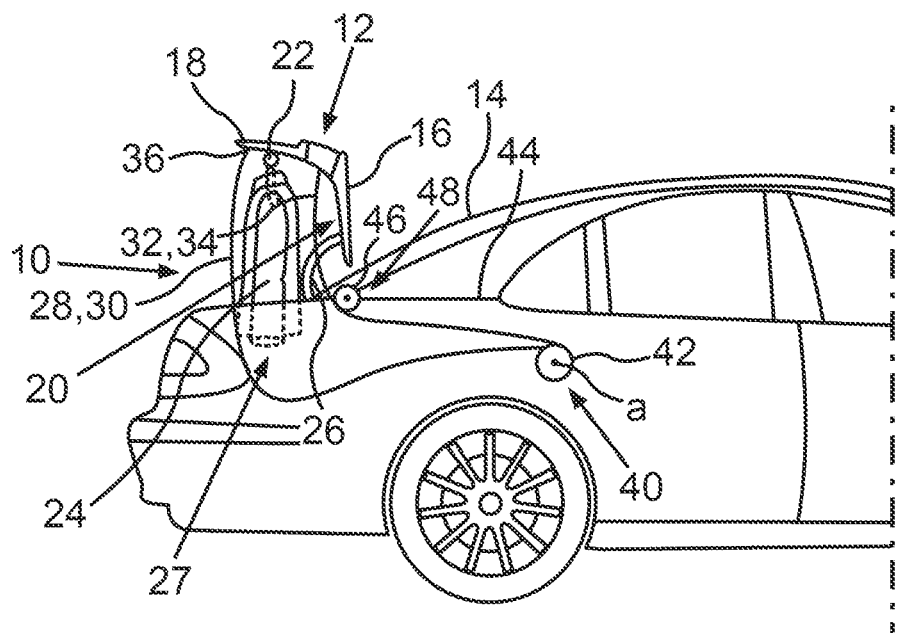
FIG. 3 shows a schematic side view of the passenger car as per FIG. 2, wherein a storage device can be seen within the stowage space with respective stowage straps, the length of which is shortened by means of a retraction device.

In addition to the stowage space lid 12 with the hanging means 22, the wardrobe comprises a storage device 28 which, in the present case, on the one hand has two flexible storage elements in the form of respective storage straps 28, 30 which—as can be seen in FIGS. 2 and 3—extend in the longitudinal direction of the vehicle behind the respective items of clothing 24.

In the present case, between the respective rear storage straps 28, 30, respective transverse storage elements 52 are provided, which are also designed, for example, as flexible straps. Altogether, the storage straps 28, 30 and the transverse storage elements 52 form a storage element made of textile straps, plastic straps or the like in the manner of a rope ladder or the like.

In the present case, the storage straps 28 and 30 or 32 and 34 are spaced or arranged further apart from one another than the typical width of items of clothing 24. The items of clothing 24 are actually retained in the present case by the transverse storage elements 52. Nevertheless, as already explained, it is also conceivable that the respective storage straps 28 and 30 or 32 and 34 are arranged at a smaller respective spacing so that the items of clothing 24 are retained directly by the storage straps 28, 39 30 or 32, 34.

In addition to the two storage straps 28, 30—running behind the items of clothing 24 in the longitudinal direction of the vehicle—and the transverse storage elements 52, the storage device 20 comprises two further flexible storage elements in the form of respective storage straps 32, 34 which run in front of the items of clothing 24 in the longitudinal direction of the vehicle, as can also be seen from FIGS. 2 and 3, for example. These two front storage straps 32, 34 are also connected to each other, for example, by transverse storage elements 52, as has already been explained in connection with the rear storage straps 28, 30. With regard to the materials and designs, reference can also be made to the explanations concerning the rear storage straps 28, 30.

Overall, the storage straps 28, 30 and 32, 34 thus run in each case on the outside or on the edge of the items of clothing 24, whereby they come into direct contact in particular with the front or rear transverse storage elements 52.

Alternatively, both rear storage straps 28, 30 and/or both front storage straps 32, 34 can be spaced apart from each other in relation to the transverse direction of the vehicle in such a way that they can come into direct contact with the items of clothing when they are retracted, as will be explained in more detail below, and not just with the transverse storage elements 52. In this case, the spacing between both rear storage straps 28, 30 and/or both front storage straps 32, 34 is, for instance, between 20 and 50 centimetres. It is also conceivable that instead of multiple storage straps 28, 30, only one flexible storage element, for example in the form of a fabric web, is provided.

The respective rear storage straps 28, 30 or front storage straps 32, 34 are each attached to the inside 20 of the stowage space lid 12 with their one end 36 or 38. By way of example, when the stowage space lid 12 is open, the rear storage straps 28, 30 have their respective ends 36 attached in the area 18 behind the hanging means 22, whereas the front storage straps 32, 34 have their respective ends 38 attached in the area 18 of the stowage space lid 12 to the front of the items of clothing 24.

Furthermore, the storage device 27 comprises a retraction device 40 with one or more retracting rollers 42, which is rotatable about an axis a which extends at least substantially in the transverse direction of the vehicle and horizontally in the area of an upper side 44 of the stowage space 10 and to the front in the stowage space lid 12. The respective storage straps 28, 30 or 32, 34 are rolled onto the one or more retracting rollers 42 with ends directed away from their respective ends 36 or 38.

In addition, the retraction device 40 comprises a deflecting roller 46 or, where necessary, a plurality of deflecting rollers 46 around which, in particular, the front storage straps 32, 34 can be deflected around a corner area 48 on the upper side 44 of the stowage space 12, which area is adjacent to a front edge of the stowage space lid 12.

As can now initially be seen when viewing FIGS. 1 and 2 together, the flexible storage straps 28, 30 at the rear of the items of clothing 24 and the storage straps to the front of the items of clothing 24 are unwound with an appropriate amount of slack when the stowage space lid 12 is open, so that respective items of clothing 24 can be conveniently hung on or removed from the hanging means 22.

When viewing FIGS. 2 and 3 together, it can be seen that in an early phase of a closing movement of the stowage space lid 12, the respective storage straps 28, 30, 32, 34 and the transverse storage elements 52 are retracted around the retracting roller 42 by means of the retraction device 40. This can take place, for example, in reaction the closing movement of the stowage space lid 12 starting. Other mechanisms are also conceivable here, for example spring-loaded pull-out mechanisms. As can be seen in FIG. 3, the retraction of the respective storage straps 28 to 34 brings in particular the rear storage straps 28, 30 and/or their transverse storage elements 52 into contact with the items of clothing 24 or the rearmost item of clothing 24.

Figure 4:
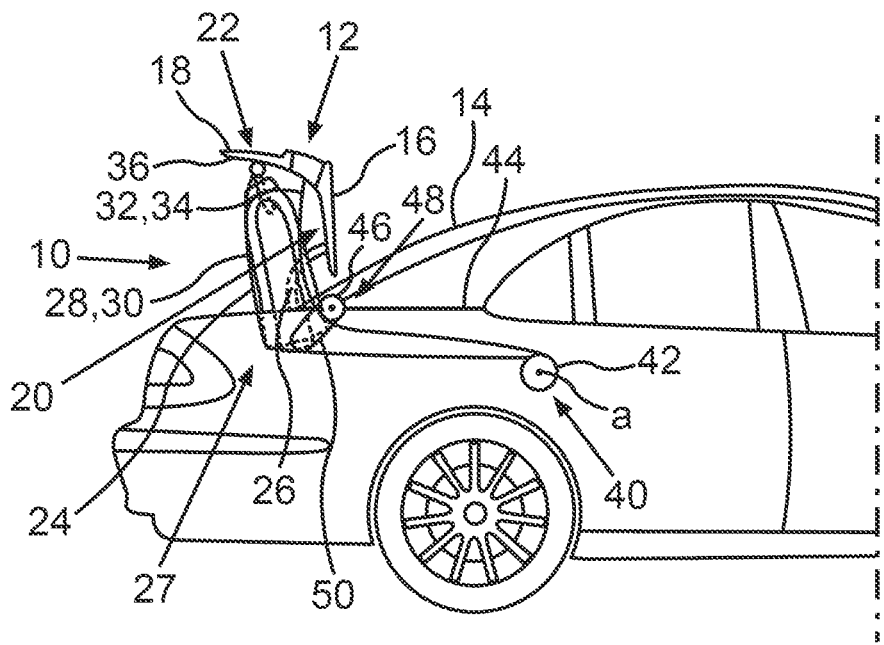
FIG. 4 shows a further side view of the passenger car analogous to FIGS. 2 and 3, wherein in this case, when the stowage space lid is closed, the items of clothing can be displaced by means of the storage device from the hanging position to a storage position at least substantially on the underside of the inside of the stowage space lid and/or of an upper side of the stowage space.
Figure 5:
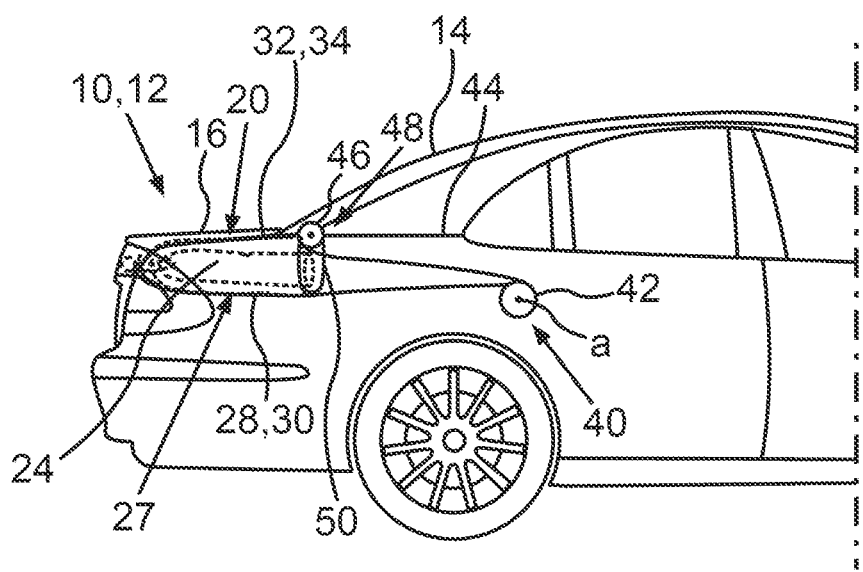
FIG. 5 shows a further side view of the passenger car analogous to FIGS. 2 to 4, wherein in this case the stowage space lid is arranged in its closed position in which the items of clothing are accommodated in their storage position at least substantially on the underside of the inside of the stowage space lid and/or of the upper side of the stowage space.

In the further course of the closing movement of the stowage space lid 12, which can be seen in FIGS. 4 and 5 in side views analogous to FIGS. 2 and 3, a further retraction of both the rear storage straps 28, 30 and the front storage straps 34, 36 takes place when closing the stowage space lid 12. In particular, the rear storage straps 28, 30 and their and the associated transverse storage elements 52 ensure that the items of clothing 24 are moved or displaced from hanging position when the stowage space lid 12 is open as shown in FIGS. 1 to 3 to an inclined intermediate position (FIG. 4) or to a storage position which they assume when the stowage space lid 12 is at least approximately closed as per FIG. 5. In this storage position, the items of clothing 24 are located substantially on the underside of the inside of the stowage space lid 12, to be more precise underneath the inside 20 of the area 16 of the stowage space lid 12, and below the upper side 44 of the stowage space 10 in the case of relatively long items of clothing 24. In this case, the items of clothing rest from above on the rear and now lower storage straps 28, 30. In this case, the items of clothing rest from above on the rear, now lower storage straps 28, 30 and/or their associated transverse storage elements 52.

The essential function of the front or, in the storage position, upper storage straps 32, 34 and their transverse storage elements 52 is to deflect the items of clothing 24 around the corner area 48 at the rear end of the upper side 44 of the stowage space 10, which is adjacent to the front edge of the stowage space lid 12, and thus to ensure that the items of clothing 24 are moved with their respective lower ends collision-free and properly underneath the upper side 44 of the stowage space 10. In addition, the front, and in the storage position, upper storage straps 32, 34 also serve to clamp the items of clothing 24 between them and the rear or, in the storage position, lower storage straps 28, 30.

Viewing FIGS. 4 and 5 together also shows that at least one or more guide elements 50 are provided in the deflecting roller 46, by means of which the flexible storage straps 28, 30 are retained spaced apart from one another relative to the storage straps 32, 34 in the storage position. In the area of the other ends 36, 38, the storage straps 28, 30 or 32, 34 are spaced apart by their corresponding attachment points.

Figure 6:
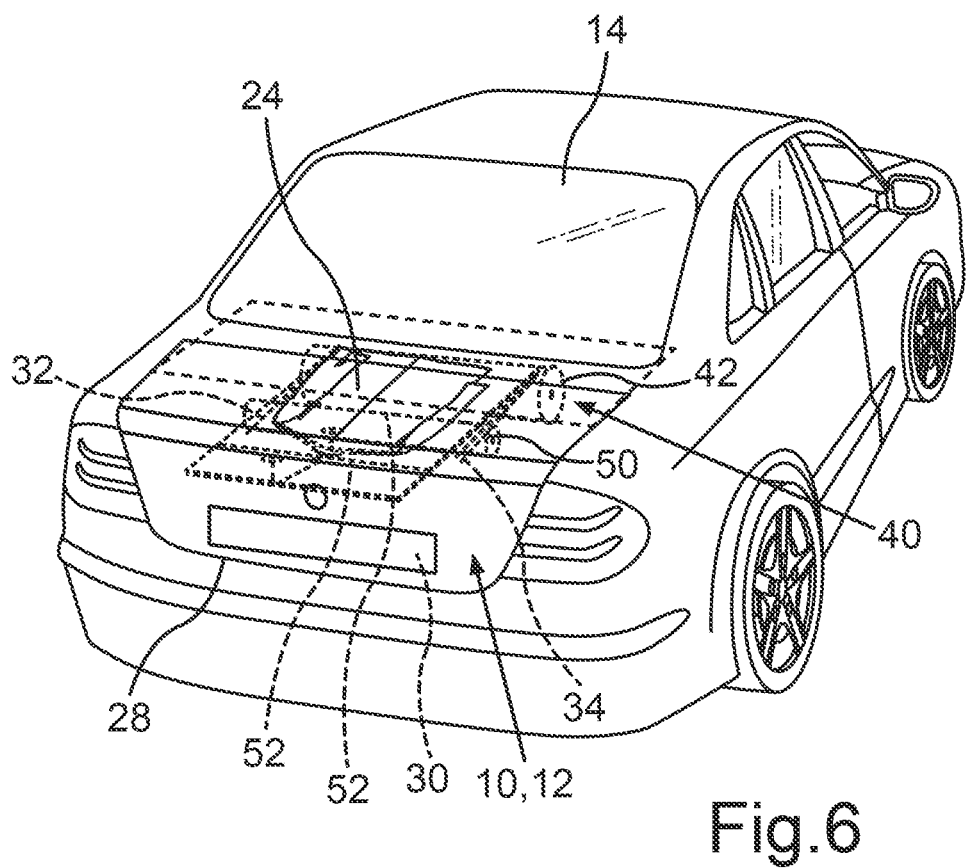
FIG. 6 shows a schematic and perspective rear view of the passenger car analogous to FIG. 1, wherein in this case, analogous to FIG. 5, the stowage space lid is illustrated in its closed position in which the items of clothing are arranged by means of the storage device in their storage position at least substantially on the underside of the inside of the stowage space lid and/or of the upper side of the stowage space.

In FIG. 6, a schematic and perspective rear view analogous to FIG. 1 shows the saloon again with the stowage space lid 12 closed. In the present case, the respective transverse storage elements 52 can be seen between the respective rear and lower storage straps 28, 39 and/or between the front and upper storage straps 32, 34. It can be seen once again that the respective storage straps 28, 30 and 32, 34 are spaced or arranged further apart from one another than the typical width of items of clothing 24. In the present case, the items of clothing 24 are also retained by the transverse storage elements 52. Nevertheless, as already explained, it is also conceivable that the respective storage straps 28 and 30 or 32 and 34 are arranged at a narrower respective spacing so that the items of clothing 24 are retained directly by the storage straps 28, 39 or 32, 34.

As already explained, a wider storage web or similar storage element can be used instead of the storage straps 28, 30 or 32, 34. Overall, it can be seen that the items of clothing 24 are arranged in their storage position in an upper area of the stowage space 10 on the underside of the inside 20 of the area 16 of the stowage space flap 12 or underneath the upper side 44 of the stowage space 10 (in the area below a parcel shelf). The described wardrobe can thus accommodate the items of clothing 24 above a floor of the stowage space 10, whereby the items of clothing 12 can be isolated from the other luggage, can be kept clean and crease-free and, in addition, it is possible to insert and remove the clothing easily. In addition, an efficient use of space of the luggage compartment or stowage space 10 is thus provided.

This wardrobe is not limited exclusively to notchback vehicles. Such a wardrobe is conceivable in estate cars, coupé vehicles or convertibles.

The invention claimed is:

1. A wardrobe of a stowage space (10) of a passenger car, comprising:
    a stowage space lid (12), wherein a hanger (22) is disposed on an inside (20) of the stowage space lid (12) and wherein an item of clothing (24) is hangable on the hanger (22) in a hanging position when the stowage space lid (12) is open; and
    a storage device (27), wherein the item of clothing (24) is displaceable by the storage device (27), when the stowage space lid (12) is closed, from the hanging position to a storage position on an underside of the inside (20) of the stowage space lid (12) and/or below an upper side (44) of the stowage space (10);
    wherein the storage device (27) has a first flexible storage element (28, 30) and wherein a length of the first flexible storage element (28, 30) is changeable by a retraction device (40);
    wherein the first flexible storage element (28, 30) is comprised of a first set of two storage straps (28, 30).

2. The wardrobe according to claim 1, wherein a second flexible storage element (32, 34) is disposed on a side of the item of clothing (24) opposite the first flexible storage element (28, 30), wherein a length of the second flexible storage element (32, 34) is changeable by the retraction device (40), and wherein the item of clothing (24) is arrangeable in the storage position between the first flexible storage element (28, 30) and the second flexible storage element (32, 34).

3. The wardrobe according to claim 2, wherein the second flexible storage element (32, 34) is comprised of a second set of two storage straps (32, 34).

4. The wardrobe according to claim 1, wherein a transverse storage element (52) extends between the two storage straps (28, 30) of the first set of two storage straps (28, 30).

5. The wardrobe according to claim 4, wherein the transverse storage element (52) is flexible.

6. The wardrobe according to claim 3, wherein the storage device (27) has a deflector element (46) for the second flexible storage element (32, 34).

7. The wardrobe according to claim 6, wherein a guide element (50) is disposed on the deflector element (46) and wherein the two storage straps (32, 34) of the second set of two storage straps (32, 34) are retained spaced apart from one another in the storage position by the guide element (50).

8. A wardrobe of a stowage space (10) of a passenger car, comprising:
- a stowage space lid (12), wherein a hanger (22) is disposed on an inside (20) of the stowage space lid (12) and wherein an item of clothing (24) is hangable on the hanger (22) in a hanging position when the stowage space lid (12) is open; and
- a storage device (27), wherein the item of clothing (24) is displaceable by the storage device (27), when the stowage space lid (12) is closed, from the hanging position to a storage position on an underside of the inside (20) of the stowage space lid (12) and/or below an upper side (44) of the stowage space (10);
- wherein the storage device (27) has a first flexible storage element (28, 30) and wherein a length of the first flexible storage element (28, 30) is changeable by a retraction device (40);
- wherein a second flexible storage element (32, 34) is disposed on a side of the item of clothing (24) opposite the first flexible storage element (28, 30), wherein a length of the second flexible storage element (32, 34) is changeable by the retraction device (40), and wherein the item of clothing (24) is arrangeable in the storage position between the first flexible storage element (28, 30) and the second flexible storage element (32, 34).

9. The wardrobe according to claim 8, wherein the first flexible storage element (28, 30) is comprised of a first set of two storage straps (28, 30).

10. The wardrobe according to claim 8, wherein the second flexible storage element (32, 34) is comprised of a second set of two storage straps (32, 34).

11. The wardrobe according to claim 9, wherein a transverse storage element (52) extends between the two storage straps (28, 30) of the first set of two storage straps (28, 30).

12. The wardrobe according to claim 11, wherein the transverse storage element (52) is flexible.

13. The wardrobe according to claim 10, wherein the storage device (27) has a deflector element (46) for the second flexible storage element (32, 34).

14. The wardrobe according to claim 13, wherein a guide element (50) is disposed on the deflector element (46) and wherein the two storage straps (32, 34) of the second set of two storage straps (32, 34) are retained spaced apart from one another in the storage position by the guide element (50).

* * * * *